United States Patent [19]

Sumser et al.

[11] Patent Number: 4,653,275
[45] Date of Patent: Mar. 31, 1987

[54] EXHAUST GAS TURBOCHARGER FOR AN INTERNAL-COMBUSTION ENGINE

[75] Inventors: Siegfried Sumser, Stuttgart; Helmut Burger, Waiblingen-Hegnach, both of Fed. Rep. of Germany

[73] Assignee: Daimler-Benz Aktiengesellschaft, Fed. Rep. of Germany

[21] Appl. No.: 751,044

[22] Filed: Jul. 2, 1985

[30] Foreign Application Priority Data

Jul. 27, 1984 [DE] Fed. Rep. of Germany ....... 3427715

[51] Int. Cl.⁴ .............................................. F02B 37/12
[52] U.S. Cl. .................................... 60/602; 415/116; 415/151
[58] Field of Search .................................. 60/600–603, 60/605; 415/116, 151, 154, 155; 417/407

[56] References Cited

U.S. PATENT DOCUMENTS 2,860,827 11/1958 Egli ...................................... 417/407

FOREIGN PATENT DOCUMENTS 1253510 11/1967 Fed. Rep. of Germany ........ 60/602
3346472 12/1983 Fed. Rep. of Germany .
5427 1/1983 Japan ..................................... 60/602
18522 2/1983 Japan ..................................... 60/602

*Primary Examiner*—Michael Koczo
*Attorney, Agent, or Firm*—Barnes & Thornburg

[57] ABSTRACT

The exhaust gas flow of an internal-combustion engine is be supplied to a turbine wheel of a radial turbine through a gas duct arrangement in the turbine housing. A guiding device is controlled as a function of operational parameters of the internal combustion engine, by means of which the exhaust gas current can be rerouted into separate gas ducts of the duct arrangement. In order to achieve an improved behavior in the lower nonsteady speed range, one of the gas ducts opens at a front side of the turbine housing on the side of the turbine wheel shaft in the area of the moving blades of the turbine wheel.

15 Claims, 5 Drawing Figures

EXHAUST GAS TURBOCHARGER FOR AN INTERNAL-COMBUSTION ENGINE

BACKGROUND AND SUMMARY OF THE INVENTION

This invention relates to an exhaust gas turbocharger for an internal-combustion engine of the type having a radial turbine with exhaust gas supplied in the radial direction to drive the turbine blades.

On the basis of German Pat. No. (DE-PS) 31 35 107, an exhaust gas turbocharger of this type is known, the turbine of which has a bypass. The bypass comprises a shutoff device that can be actuated by means of an actuating drive and influenced by the detected operating parameters of the internal-combustion engine. However, in this case, it is a disadvantage that the efficiency of the exhaust gas turbocharger in the lower speed range is still unsatisfactory. In the case of today's small radial turbine housings, a flow occurs against the blades of the turbine wheel that is high in losses, especially in the lower speed range. This flow results in an extreme thrust flow and negatively influences the consumption behavior of the internal-combustion engine because of the flat flow against the blades.

It is an objective of the invention to improve the efficiency of a radial turbine in the lower speed range.

According to the invention, this objective is achieved by providing an exhaust gas duct opening in the axial direction of the turbine wheel at the turbine housing on the side of the turbine wheel shaft.

Further features of preferred embodiments of the invention involve the structural arrangement of separate exhaust gas ducts formed in the turbine housing and control devices for controlling the relative exhaust flow between the exhaust gas ducts as a function of the turbine speed and/or changing air output pressure.

The radial turbine arrangement constructed according to the invention has the further advantage that the blades of the turbine wheel of the radial turbine of the exhaust gas turbocharger are designed for two different operational ranges. Thus the blades have a physical bend which, in the case of a radial flow feeding in the upper speed range of the exhaust gas turbocharger, permits a flow against the blades that has few thrust losses. In a lower speed range of the exhaust gas turbocharger, the feeding of the flow takes place approximately semiaxially to the blades with improved operation at these speeds. On the basis of the blade bend along the axial extension, a flow against the blades is also obtained in this lower speed range that has few thrust losses so that the nonsteady behavior in the lower speed range of the exhaust gas turbocharger is significantly improved.

Further objects, features, and advantages of the present invention will become more apparent from the following description when taken with the accompanying drawings which show, for purposes of illustrating only, an embodiment in accordance with the present invention.

DETAILED DESCRIPTION OF THE DRAWINGS

Figure 1:
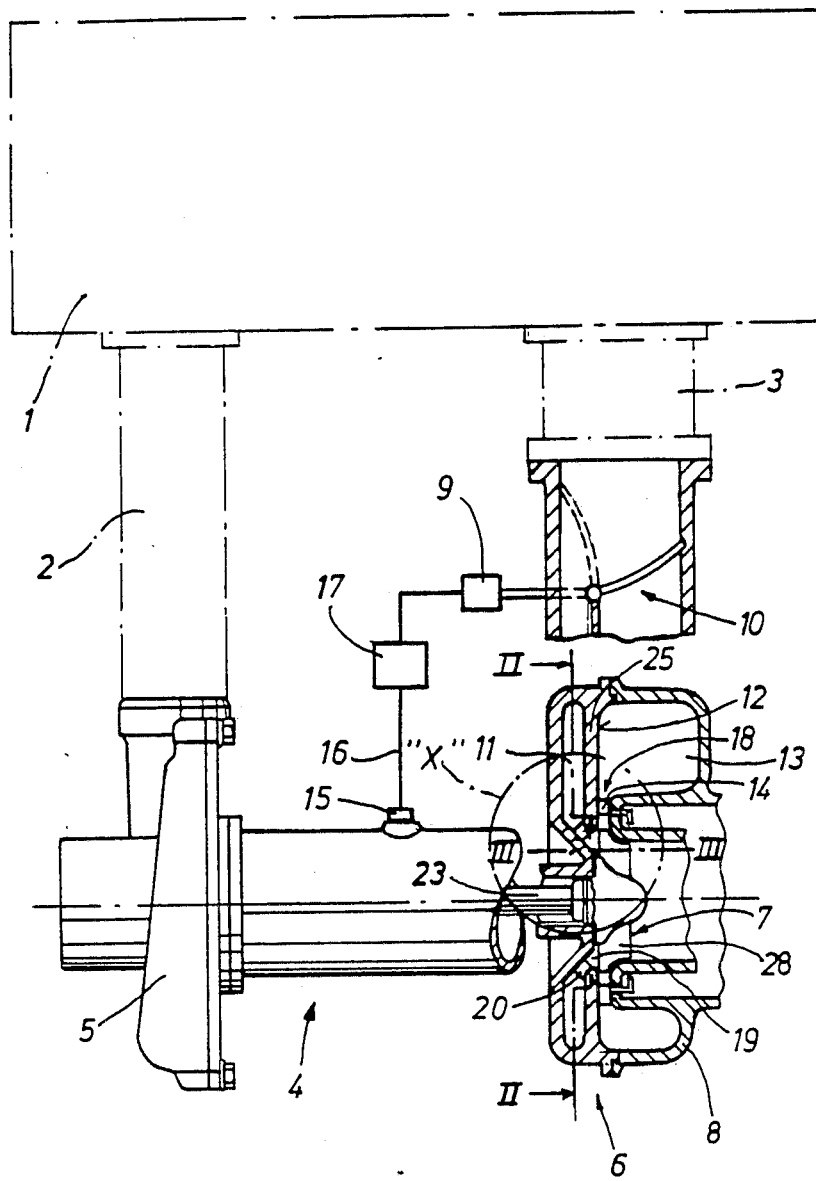
FIG. 1 is a longitudinal sectional schematic view of a radial turbine driving a compressor constructed in accordance with a preferred embodiment of the present invention.
Figure 4:
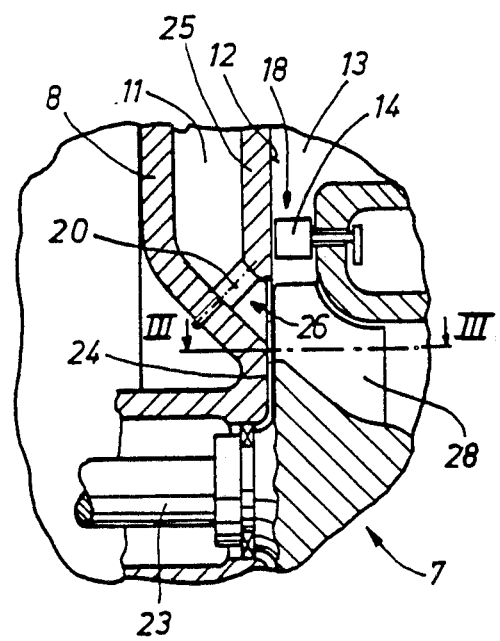
FIG. 4 is a detail of the radial turbine housing that is marked with "x" in FIG. 1.

An internal-combustion engine shown in diagram form in FIG. 1 comprises an intake system 2, an exhaust gas system 3 and an exhaust gas turbocharger 4. The exhaust gas turbocharger 4 has a compressor 5 and a turbine arrangement 6 with a radial turbine wheel 7. The radial turbine wheel 7 is surrounded by a radial turbine housing 8 having spiral-shaped gas ducts 11, 13. Upstream of the spiral-shaped gas ducts 11, 13, a guiding device 10 is arranged in the radial turbine housing 8. Guiding device 10 is controllably influenced by an actuating drive 9 of a control unit 17. By means of a sensor 15, the speed of the radial turbine wheel 7 can be determined, which is fed to the control unit via a signal-transmitting line 16. A plurality of pivotal flaps 14 are arranged in the nozzle area 18 of the spiral-shaped gas duct 13, shown as detail "x" in FIG. 4. The gas duct 11 opens out at a front side 12 of the radial turbine housing 8 on the side of the turbine wheel shaft. The area of the mouth is developed to be in the shape of a circular or ring shaped nozzle 26 (see FIG. 4). A plurality of pivotal flaps 20 are arranged upstream of the area of the mouth of the gas duct 11.

Figure 2:
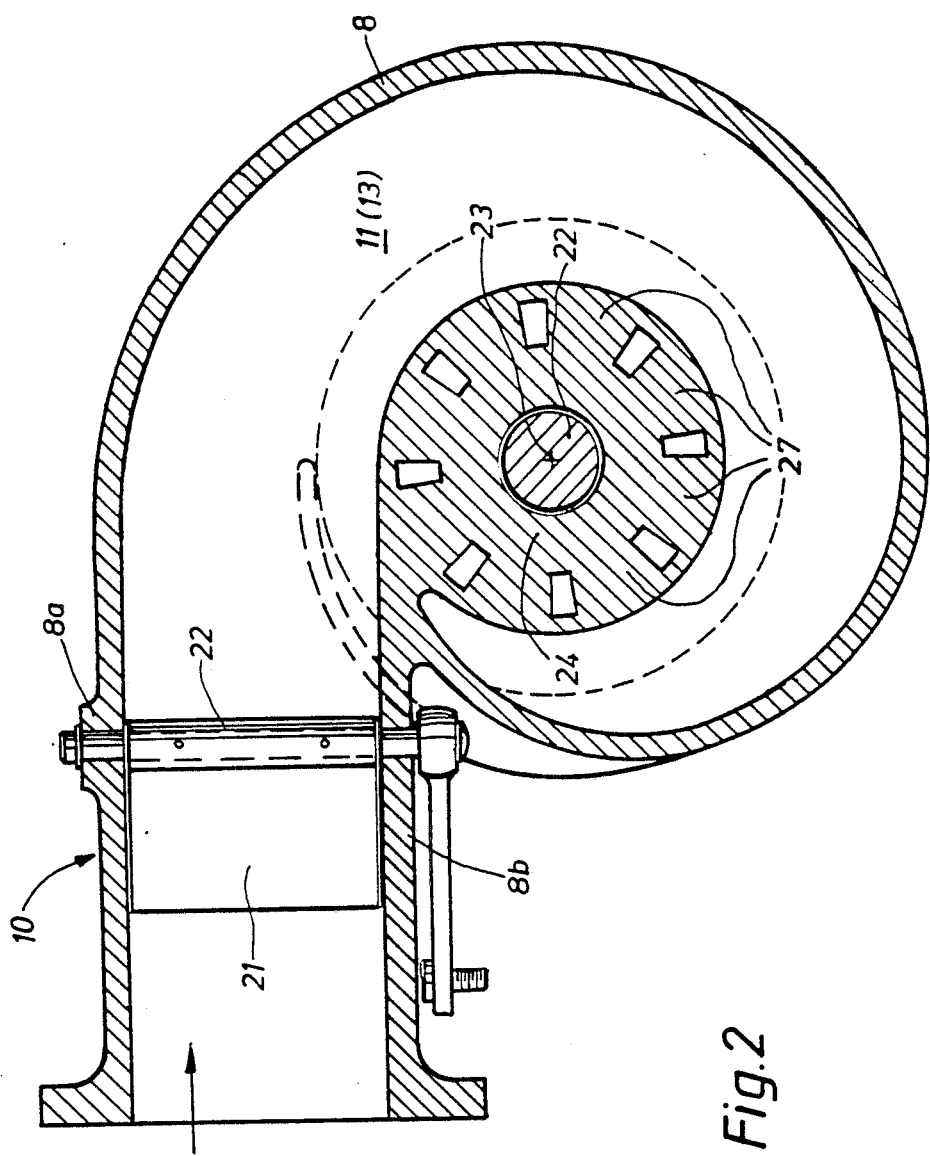
FIG. 2 is a cross-sectional view through the radial turbine housing taken along section I—I of FIG. 1.

The radial turbine housing 8, shown in FIG. 2 in its cross-section, comprises the spiral-shaped gas ducts 11, 13 with the guiding device 10 arranged upstream of the spiral-shaped gas duct 11. A guiding body 21 of the guiding device 10 is fastened on a shaft 22 which is pivotally supported in the respective adjacent walls 8a, 8b of the gas ducts 11, 13. A hub 24 extends around a rotational axis 23 of the shaft 22 of the radial turbine wheel 7. Surrounding ring-shaped nozzle 26 is located in the mouth area of the gas duct 11 between the hub 24 and a wall 25 which separates the spiral-shaped gas ducts 11, 13. The circular nozzle cross-section can be made into channels by means of a plurality of uniform and evenly distributed segments 27.

Figure 3:
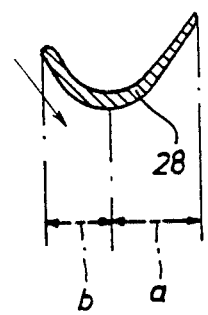
FIG. 3 is a cross-sectional view through a blade of the radial turbine wheel taken along section II—II of the FIG. 1.

As shown in FIG. 3, against which the flow is directed, the blades 28 of the radial turbine wheel have a concave surface along the axial extension. The bend of the blades 28 in the axial longitudinal direction, as well as the axial longitudinal extension from a downstream section (a) and an upstream section (b) of the blades are asymmetrical. In the case of the illustrated embodiment, the length (a) is larger than the length (b).

When the internal-combustion engine is operated in the lower speed range, where the exhaust gas mass flow is low, the actuating drive 9 have moved the guiding body 21 of the guiding device 10 into the position shown in FIG. 1. The exhaust gas flow of the internal-combustion engine is then supplied to the surrounding nozzle 26 via the gas duct 11. In the nozzle 26 area, the exhaust gas flow can be influenced by the plurality of pivotal flaps 20 upstream of same so as to act upon the blades of the radial turbine wheel 7 approximately semi-axially, as indicated by the arrow in FIG. 3. Because of the approximately thrust-free flow against the blades of the radial turbine wheel 7, the response behavior of the charged internal-combustion engine is improved, and a reduction of the fuel consumption is achieved because of the increased overall efficiency of the exhaust gas turbocharger.

When the speed of the radial turbine wheel determined by the sensor 15 exceeds an indicated preselected speed, the control unit 17 actuates the actuating drive to block the gas duct 11 by means of the guiding body 21 of the guiding device 10. The exhaust gas flow of the internal-combustion engine through the gas duct 13, which is influenced by the plurality of pivotal flaps 14, is then in a known manner supplied radially to the blades of the radial turbine.

Figure 1A:
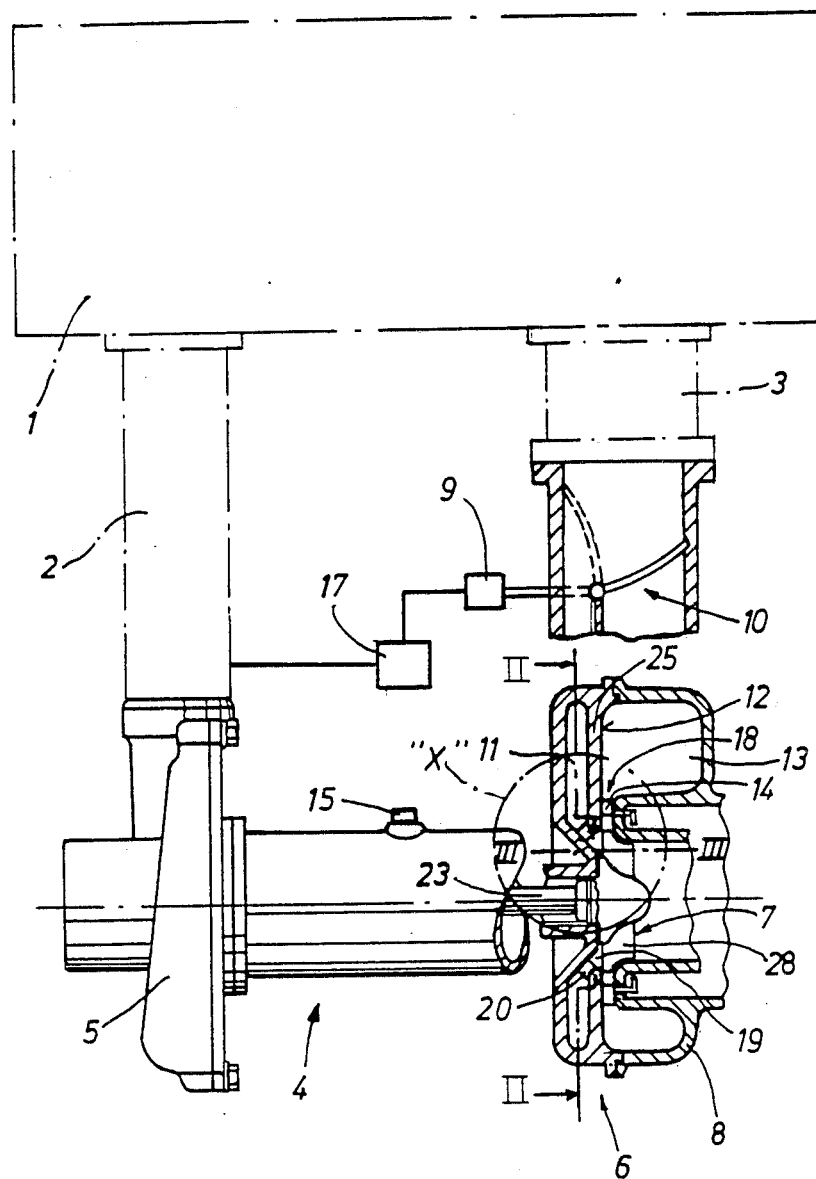
FIG. 1a is a longitudinal sectional schematic view of an alternate preferred embodiment of the present invention.

The control unit 17 may also be influenced by the charge pressure in the intake system determined by a sensor instead of by the speed of the radial turbine wheel. This is shown in FIG. 1a.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An exhaust gas turbocharger arrangement for an internal combustion engine, comprising:
radial turbine means including a turbine wheel with turbine blades on a rotatable turbine wheel shaft, said turbine wheel having a rear side which is the side of the turbine wheel closest to an end of the rotatable turbine wheel shaft in the axial direction,
turbine housing means surrounding the turbine wheel, and
engine exhaust guide means for communicating exhaust gas from an engine to drive said turbine means,
wherein the exhaust guide means includes first exhaust duct means opening to the turbine wheel around the circumference thereof and second exhaust duct means opening to the turbine blades such that a substantial portion of said exhaust gas communicated by said second exhaust duct means impinges on the rear side of the turbine wheel radially inward of the turbine wheel circumference.

2. An arrangement according to claim 1, wherein exhaust gas guiding means are provided for dividing the exhaust gas flow between the first and second exhaust duct means in dependence on operating parameters of the engine.

3. An arrangement according to claim 2, wherein the second exhaust gas duct means has a spiral shape and is integrated in the turbine housing means.

4. An arrangement according to claim 2, wherein the mouth area of the second exhaust gas duct means has the shape of a ring nozzle.

5. An arrangement according to claim 4, wherein a ring nozzle shaped mouth area of the second exhaust duct means exhibits a plurality of nozzles formed between evenly distributed segments.

6. An arrangement according to claim 3, wherein a ring nozzle shaped mouth area of the second exhaust duct means exhibits a plurality of nozzles formed between evenly distributed segments.

7. An arrangement according to claim 2, wherein the exhaust guiding means includes:
a movable guiding device for selectively directing the flow of exhaust gas into the first and second exhaust duct means,
actuating drive means for controlling the position of the guiding device, and
control means for controlling the operation of the actuating drive means in such a way that the flow of exhaust gases in the second exhaust duct means is increased when the turbine speed is below a predetermined value.

8. An arrangement according to claim 4, wherein the exhaust guiding means includes:
a movable guiding device for selectively directing the flow of exhaust gas into the first and second exhaust duct means,
actuating drive means for controlling the position of the guiding device, and
control means for controlling the operation of the actuating drive means in such a way that the flow of exhaust gases in the second exhaust duct means is increased when the turbine speed is below a predetermined value.

9. An arrangement according to claim 7, wherein an air charging compressor impeller is driven by the turbine wheel, and wherein the control means includes means for controlling the actuating drive means as a function of the charge pressure of the charged air delivered by the compressor.

10. An arrangement according to claim 8, wherein an air charging compressor impeller is driven by the turbine wheel, and wherein the control means includes means for controlling the actuating drive means as a function of the charge pressure of the charged air delivered by the compressor.

11. An arrangement according to claim 2, wherein each blade of the turbine wheel has one side against which the flow is directed, said side being formed concavely along the axial extension.

12. An arrangement according to claim 3, wherein each blade of the turbine wheel has one side against which the flow is directed, said side being formed concavely along the axial extension.

13. An arrangement according to claim 2, wherein a plurality of pivotal flaps are arranged upstream of the ring nozzle shaped mouth area of the second gas duct means.

14. An arrangement according to claim 3, wherein a plurality of pivotal flaps are arranged upstream of the ring nozzle shaped mouth area of the second gas duct means.

15. An arrangement according to claim 5, wherein a plurality of pivotal flaps are arranged upstream of the ring nozzle shaped mouth area of the second gas duct means.

* * * * *